United States Patent
Ohnuma et al.

(10) Patent No.: US 6,574,010 B1
(45) Date of Patent: *Jun. 3, 2003

(54) IMAGE PROCESSING APPARATUS AND METHOD

(75) Inventors: Nobuo Ohnuma, Yokohama (JP); Takatoshi Ohta, Yokohama (JP); Yuji Akiyama, Yokohama (JP); Yoko Hirosugi, Fujisawa (JP); Takahiro Moro, Wako (JP); Masahiro Nagatani, Yokohama (JP); Kazuyoshi Sumiuchi, Machida (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/688,777

(22) Filed: Jul. 31, 1996

(30) Foreign Application Priority Data

Jul. 31, 1995 (JP) ............................................. 7-194979
Jul. 31, 1995 (JP) ............................................. 7-194980

(51) Int. Cl.$^7$ .................................................. G03F 3/08
(52) U.S. Cl. ........................ 358/1.9; 358/529; 358/518
(58) Field of Search ................................ 358/529, 518, 358/462, 1.9, 519, 521, 530; 395/109; 382/164, 167

(56) References Cited

U.S. PATENT DOCUMENTS

| 4,763,190 A | * | 8/1988 | Froelich ........................ 358/79 |
| 4,908,712 A | * | 3/1990 | Uchiyama et al. ........... 358/298 |
| 5,084,762 A | * | 1/1992 | Miyakawa .................... 358/79 |
| 5,166,810 A | * | 11/1992 | Sorimachi et al. ........... 358/462 |
| 5,172,223 A | * | 12/1992 | Suzuki et al. |
| 5,315,381 A | * | 5/1994 | Yamashita et al. ........... 358/500 |
| 5,719,689 A | * | 2/1998 | Terada ......................... 358/529 |
| 5,764,388 A | * | 6/1998 | Ueda et al. .................. 358/529 |

FOREIGN PATENT DOCUMENTS

| JP | 401174452 A | * | 7/1989 |
| JP | 402215541 A | * | 8/1990 |

* cited by examiner

*Primary Examiner*—Madeleine Nguyen (57) ABSTRACT

An image processor includes an input unit which inputs color image data, and a color correction unit which effects under color removal processing and black generation processing on the color image data conforming to the characteristic of a recording medium, and outputs data indicative of a plurality of color components including a black component. The color correction unit effects the under color removal processing and the black generation processing so that the total output level of the data indicative of the plurality of color components including the black component may assume a value conforming to the color image data.

7 Claims, 10 Drawing Sheets

IMAGE PROCESSING APPARATUS AND METHOD

BACKGROUND OF THE INVENTION

1. Field of the Invention

This invention-relates to an image processing apparatus and method for regulating the total quantity of a developer used during image formation.

2. Related Background Art

As a color image recording system, a system is known comprising a host apparatus for transferring recording data, and a color ink jet recording apparatus for receiving the recording data from the host apparatus and causing a plurality of colors of inks to adhere to a recording surface in accordance with the data to thereby accomplish recording.

In this system, in the host apparatus, image data are represented by three primary colors, R. G and B to carry out processing and for display by a display device and on the other hand, in the recording apparatus, it is usual that image data represented by four colors, C, M, Y and K to effect recording by inks of four colors, C, M, Y and K.

In such a system, the correction/conversion processing from an RGB value depending on the display device to a CMYK value depending on the recording apparatus must be carried out. At this time, data corresponding to one page to be printed by the recording apparatus may be prepared, whereafter the above-described conversion processing may be carried out on all pixels, but recently, there is a system adopting a method of subjecting an object placed on a page, for example, graphics such as a line or a circle, or an image such as characters and a scanning image, to the above-described conversion in advance when data corresponding to one page are prepared, and placing it on the page, in order to increase the processing speed.

However, in a system adopting such method, it is originally supposed that the display device is used and therefore, it is possible to place the object on the page in three colors, R, G and B, but it is often impossible to correctly convert it to four colors, C, M, Y and K used in the recording apparatus.

In such a system, the correction/conversion processing from RGB to CMYK adopts the procedure of correcting the RGB value depending on the display device which is a color attribute individual objects have into RGB depending on the recording apparatus, using this value to dispose the object on the page, preparing data corresponding to one page, and thereafter making the RGB value depending on the recording apparatus into a CMYK value depending on the recording apparatus for all pixels. Here, the processing carried out on individual objects is called the color correction processing, and the processing for all pixels corresponding to one page is called the color conversion processing. This color conversion processing converts the RGB value depending on the recording apparatus into a CMY value, and further into a CMYK value.

In this color conversion processing, it is usual that one of three colors, C, M and Y which has the smallest value is replaced with K as a non-coloring, component (black generation processing), and K is subtracted from the values of the original data, respectively (under color removal processing), whereby the data are converted into data corresponding to four colors, C, M, Y and K.

The data subjected to the correction/conversion processing from RGB into CMYK in this manner are finally subjected to the output gradation correction processing for correcting the data input value vs. output density characteristic of the recording apparatus into a linear form.

Generally, in an image forming apparatus, when the smallest value of three colors, C, M and Y, is replaced with K by black generation and under color removal processing, the level for properly forming an image in the image forming apparatus is sometimes exceeded, and this has led to the problem that the quality of an output image deteriorates.

The latest recording apparatuses include ones in which it is possible to make the resolution of the recording apparatus variable by setting means for setting the resolution. In such recording apparatuses, when high resolution is set, this problem remarkably appears and the quantity of recording material per unit area exceeds a predetermined quantity, and this has led to the problem that the quality of an output image is deteriorated.

SUMMARY OF THE INVENTION

The present invention has been made in view of the above-noted points and an object thereof is to control a total output level to thereby prevent it from exceeding a level at which an image can be properly formed by an image forming apparatus.

Another object of the present invention is to provide an image processing apparatus comprising input means for inputting color image data, and color correction means for effecting under color removal processing and black generation processing conforming to the characteristic of a recording medium on said color image data, and outputting data indicative of a plurality of color components including a black component, characterized in that said color correction means effects said under color removal processing-and said black generation processing so that the total output level of said data indicative of the plurality of color components including said black component may assume a value conforming to said color image data.

The present invention has been made in view of the above-noted points and an object thereof is to control gradation correction processing so that an output image may be properly formed in conformity with set resolution.

Another object of the present invention is to provide an image processing apparatus for outputting image data to an image forming apparatus capable of forming an image on a recording medium by using a recording material at a plurality of resolutions, characterized by:

setting means for setting resolutions, gradation correction processing means for performing gradation correction processing; and control means for controlling the gradation correction processing of said gradation correction processing means to regulate the total quantity of said recording material in conformity with said set resolution.

Many widely different embodiments of the present invention may be constructed without departing from the spirit and scope of the present invention. It should be understood that the present invention is not limited to the specific embodiments described in the specification, except as defined in the appended claims.

DESCRIPTION OF THE PREFERRED EMBODIMENTS

Some preferred embodiments of the present invention will hereinafter be described with reference to the drawings.

Figure 1:
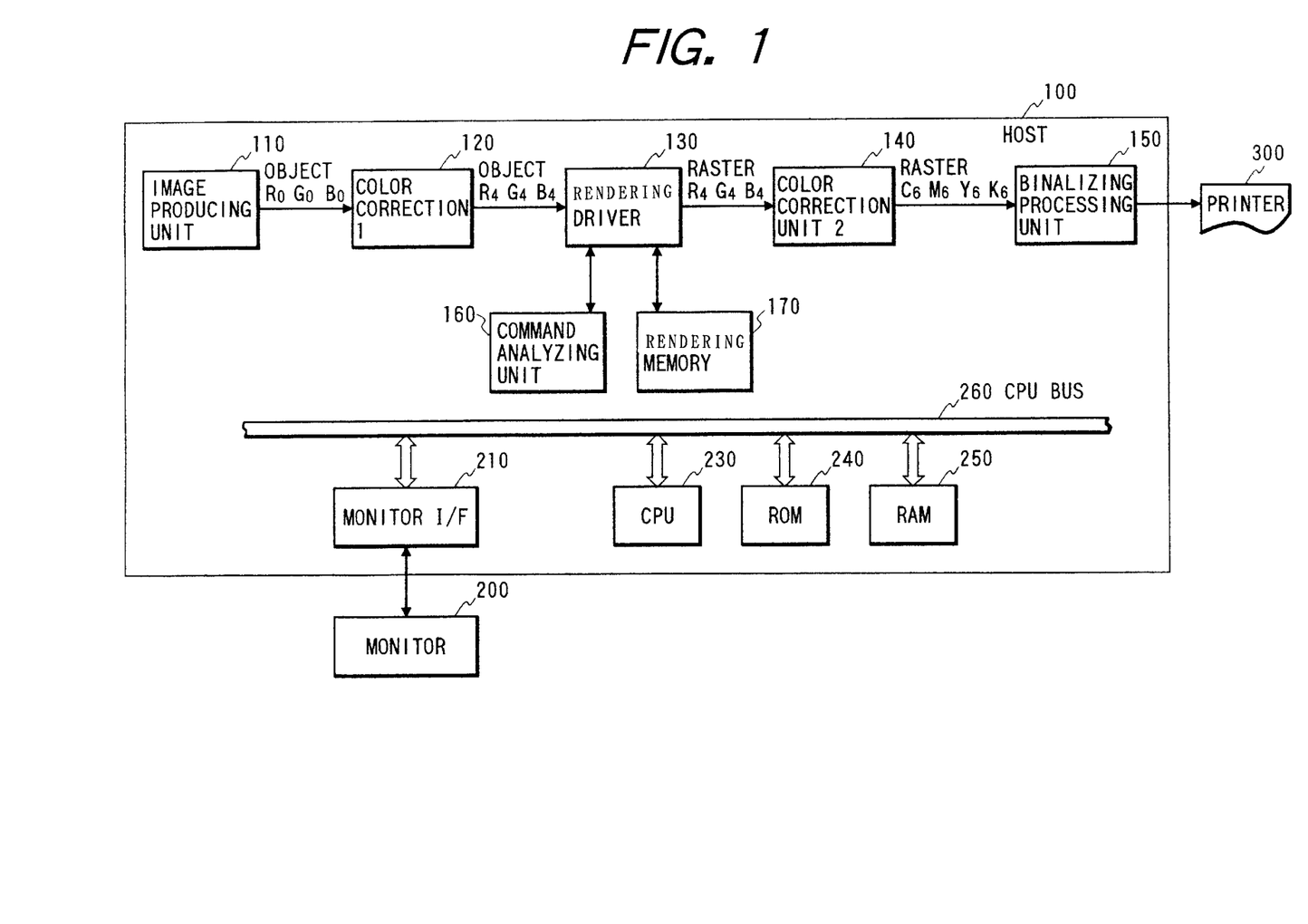
FIG. 1 shows an example of the construction of an image processing apparatus.
Figure 5:
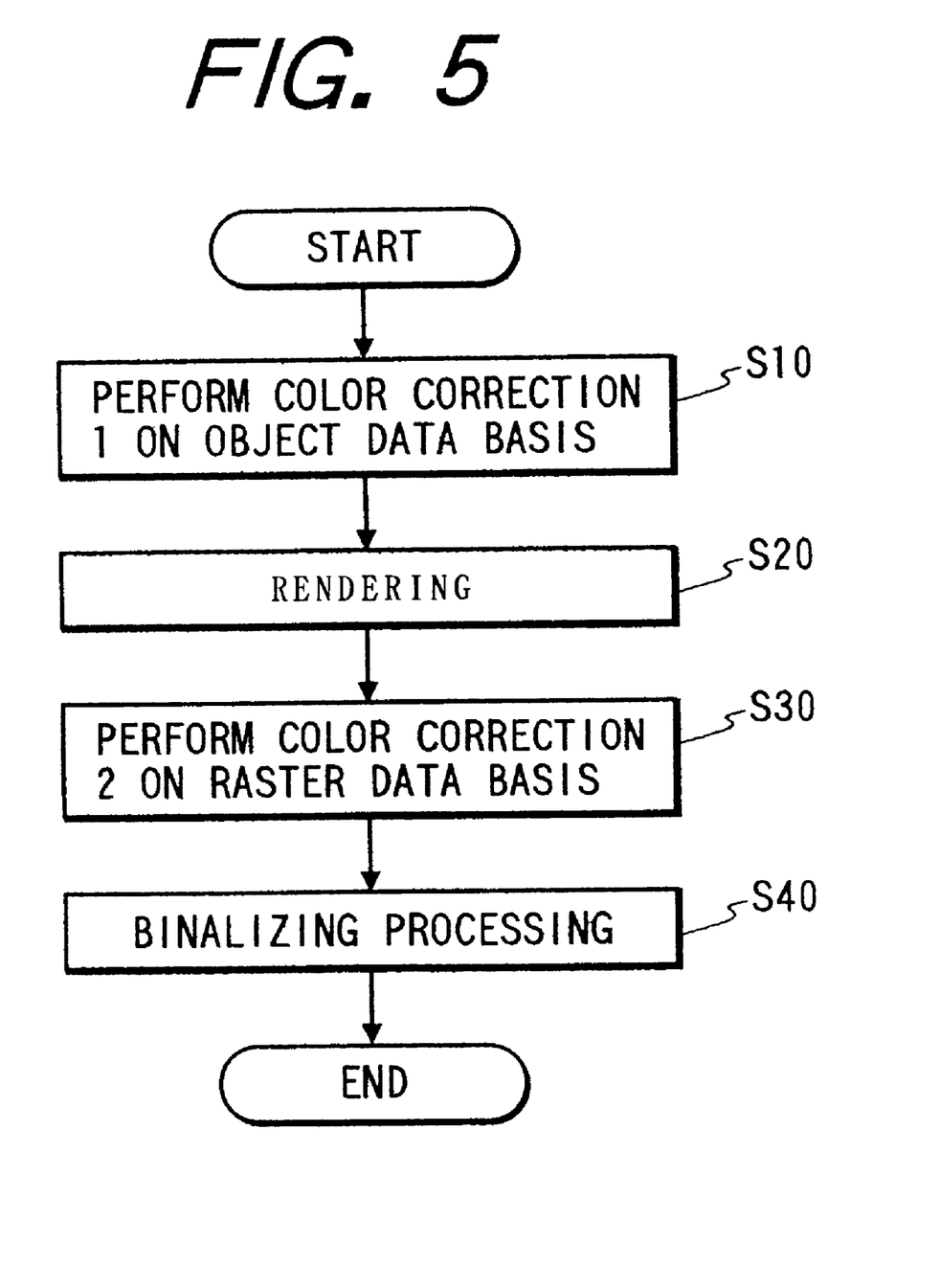
FIG. 5 shows an example of the general flow of processing.

Referring to FIG. 1 which shows an example of the construction of an image processing system according to an embodiment, this image processing system is comprised of a host 100, a monitor 200 and a printer 300. FIG. 5 is a flow chart showing the flow of the processing of the entire system.

Figure 4A:
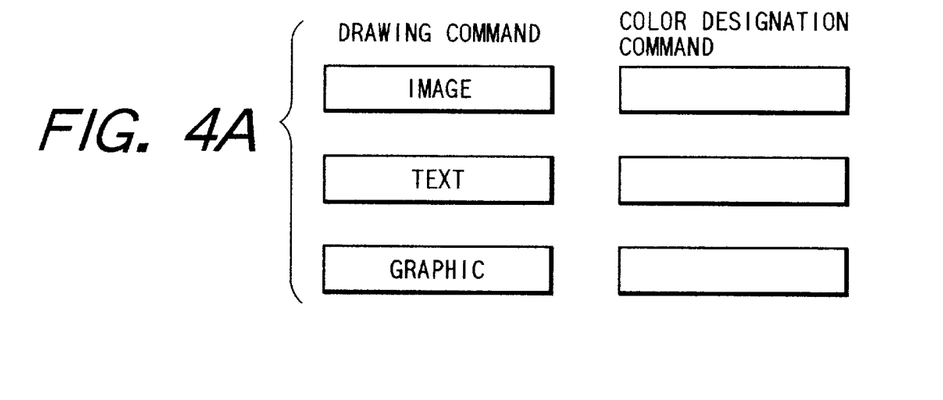
FIGS. 4A and 4B show an example of the construction of object image data.
Figure 4B:
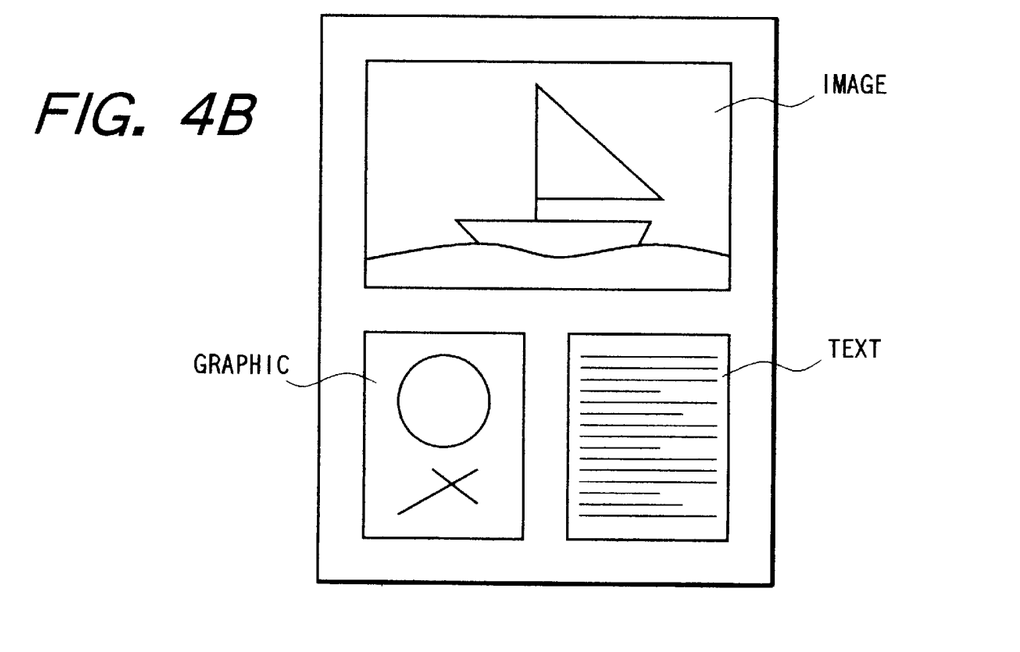

An image producing unit 110 produces data indicative of a plurality of object images constituting an image by the use of an application being operated on the host. The produced data indicative of the object images, as shown in FIGS. 4A and 4B, are comprised of a drawing command and a color designation command shown as 8 bits of $R_0\ G_0\ B_0$ indicative of the colors of the respective objects.

The data indicative of object images include ones indicative, for example, of an image (natural image), a text and a figure.

The data indicative of an object image indicative of the image is comprised of a drawing command indicative of the fact that it is an image, and a plurality of $R_0\ G_0\ B_0$ data indicative of the respective pixels of the image.

The data indicative of an object image indicative of the text is comprised of a drawing command indicative of the fact that it is a text, a character code indicative of the kind of the text, and $R_0\ G_0\ B_0$ data indicative of the color of the character.

The data indicative of an object image indicative of the figure is comprised of a drawing command indicative of the kind of figure (e.g. a circle, a line or the like) and $R_0\ G_0\ B_0$ data indicative of the color of the figure.

Also, $R_0\ G_0\ B_0$ data in the color designation command is prepared in the application while being confirmed on the monitor 200 and therefore has a characteristic depending on the monitor.

A color correction unit 1 (120) performs color correction which will be described later to the $R_0\ G_0\ B_0$ data depending on the monitor characteristic, and performs color correction to $R_4\ G_4\ B_4$ data depending on the printer characteristic of the printer 300 (S10).

A rendering driver 130 analyzes object image data comprised of a drawing command and $R_4\ G_4\ B_4$ data designating colors (a color designation command) for each object by the use of a command analyzing unit 100, develops it on a rendering memory 170 and produces $R_4\ G_4\ B_4$ data of the raster type (S20).

By this rendering process, objects indicated by the $R_4\ G_4\ B_4$ data depending on the printer characteristic are disposed at predetermined positions on a page. By all objects being disposed on the page, image data of the raster type corresponding to one page are prepared. Next, a color correction unit 2 performs color correction to each of all pixels corresponding to one page.

The color correction unit 2 (140) performs color correction 2 to the $R_4\ G_4\ B_4$ data of the raster type for each pixel, and produces $C_6\ M_6\ Y_6\ K_6$ data of the raster type (S30).

A binarizing processing unit 150 performs binarizing processing and error diffusing processing to the $C_6\ M_6\ Y_6\ K_6$ data of the raster type, and outputs binary data to the printer 300 (S40).

Each of the above-described processing units is controlled by a CPU 230 through a CPU bus 260. The CPU 230 controls each processing unit on the basis of a program stored in a ROM 240 with a RAM 250 as a work memory.

Also, the CPU bus 260 has connected thereto a monitor I/F 210 connected to the monitor 200.

The printer 300 forms an image by the use of a head of the type which causes film boiling by heat energy on the basis of CMYK data of 1 bit each outputted from the binarizing processing unit 150 to thereby discharge liquid droplets.

Figure 2:
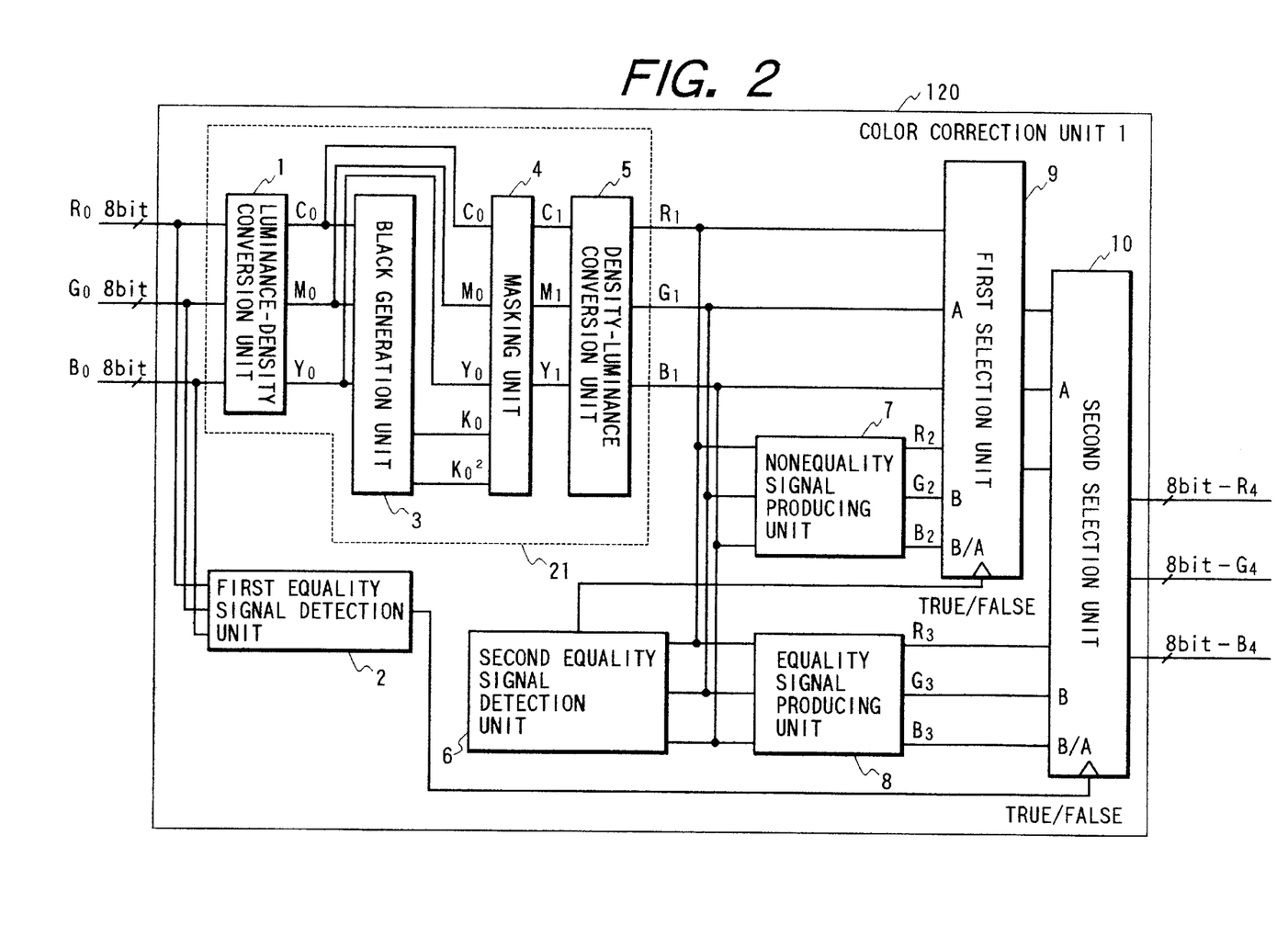
FIG. 2 shows an example of the construction of a color correction unit 1.

FIG. 2 shows an example of the construction of the color correction unit 1 (120). The color correction unit 1, as described above, color-corrects the $R_0\ G_0\ B_0$ data depending on the monitor characteristic included in the object image data into the $R_4\ G_4\ B_4$ data depending on the printer characteristics.

The color correction unit 1 (120) is comprised of color correction means 21, a first equality signal detection unit 2, a second equality signal detection unit 6, a nonequality signal producing unit 7, an equality signal producing unit 8, a first selection unit 9 and a second selection unit 10, and further the color correction means 21 is comprised of a luminance-density conversion unit 1, a black generation unit 3, a masking unit 4 and a density-luminance conversion unit 5.

First, an input signal $R_0\ G_0\ B_0$ of 8 bits which is a color designation command indicative of the color of a particular object is inputted to the first equality signal detection unit 2 and the luminance-density conversion unit 1 which one of the elements constituting the color correction means 21.

The first equality signal detection unit 2 detects whether $R_0\ G_0\ B_0$ data are equal, that is, $R_0=G_0=B_0$, and if they are equal, it outputs true, and if not so, it outputs false, and the output is inputted to the second selection unit 10.

In the luminance-density conversion unit 1, when the input signal is $X_0(X=R, G, B)$ and the output signal is $Z_0(Y=C, M, Y)$, the luminance-density conversion processing is performed on the basis of the following expression:

$$Z_0 = A \times 1/\log(X_0) \ldots (A \text{ is a constant.})$$

Also, by this luminance-density conversion processing, the correction of the strain of the $R_0\ G_0\ B_0$ data which is based on the monitor characteristic is performed.

$C_0$, $M_0$ and $Y_0$ data outputted from the luminance-density conversion unit 1 are inputted to the black generation unit 3, and $K_0$ data and $K_0^2$ data indicative of a non-coloring component are produced and inputted to the masking unit 4.

Also, the $C_0$, $M_0$ and $Y_0$ data outputted from the luminance-density conversion unit 1 are inputted to the masking unit 4 together with the $K_0$ data and $K_0^2$ data outputted from the black generation unit 3.

Figure 7:
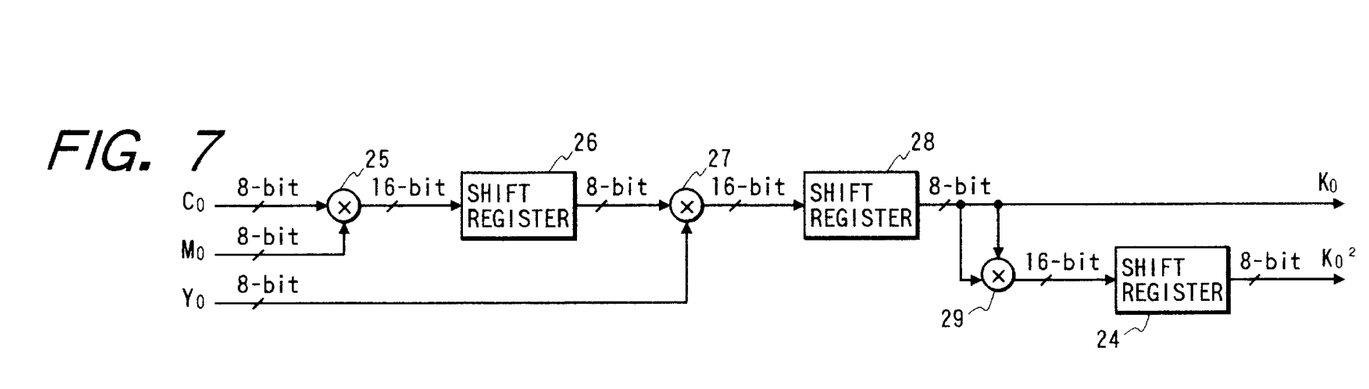
FIG. 7 shows an example of the construction of a black generation unit 3.

FIG. 7 is a block diagram showing the construction of the black generation unit 3.

In FIG. 7, the reference numerals 25, 27 and 29 designate multipliers which multiply two inputs (of 8 bits each) and output the result thereof (16 bits). Also, the reference numerals 26, 28 and 24 denote shift registers which shift the outputs from the multipliers to the left by 8 bits to thereby convert them into 8-bit data. By these processes, $K_0$ and $K_0^2$ based on the following expressions are found.

$$K_0 = (C_0 \times M_0 \times Y_0)/(256 \times 256)$$

$$K_0^2 = (K_0 \times K_0) \times 256$$

As described above, $K_0$ and $K_0^2$ are found from the product of $C_1$, $M_1$ and $Y_1$.

Thus, $K_0$ data and $K_0^2$ data which are non-coloring components are produced by the product, whereby gray balance can be kept good.

Also, the $C_0$, $M_0$ and $Y_0$ data outputted from the luminance-density conversion unit 1 are inputted to the masking unit 4 with the $K_0$ data and $K_0^2$ data outputted from the black generation unit 3, and are subjected to color correction based on the output of the printer by a matrix calculation, and are converted into $C_1$, $M_1$ and $Y_1$ data.

The relations between $C_0$, $M_0$, $Y_0$, $K_0$, $K_0^2$ and $C_1$, $M_1$, $Y_1$ are determined by the following expressions:

$$C_1 = a_{00} \times C_0 + a_{01} \times M_0 + a_{02} \times Y_0 + a_{03} \times K_0 + a_{04} \times K_0^2$$

$$M_1 = a_{10} \times C_0 + a_{11} \times M_0 + a_{12} \times Y_0 + a_{13} \times K_0 + a_{14} \times K_0^2$$

$$Y_1 = a_{20} \times C_0 + a_{21} \times M_0 + a_{22} \times Y_0 + a_{23} \times K_0 + a_{24} \times K_0^2$$

... ($a_{ij}$: $0 \leq i \leq 2$, $0 \leq j \leq 4$ being constants)

As can be seen from these expressions, color-converted $C_1$, $M_1$ and $Y_1$ are values color-converted in a form including $K_0$ and $K_0^2$ and moreover, $K_0$ and $K_0^2$ are values found by the product of $C_0$, $M_0$ and $Y_0$.

Further, masking-calculated $C_1$, $M_1$ and $Y_1$ data are inputted to the density-luminance conversion unit 5, whereby they are again converted into luminance signals ($R_1$, $G_1$ and $B_1$ data) and are outputted.

The $R_1$, $G_1$ and $B_1$ data which are luminance signals are inputted to the second equality signal detection unit 6, the nonequality signal producing unit 7 and the equality signal producing unit 8. The second equality signal detection unit 6 detects whether the $R_1$, $G_1$ and $B_1$ data are equal, that is, $R_1 = G_1 = B_1$, and if they are equal, it outputs true to the first selection unit 9, and if not so, it outputs false to the first selection unit 9. If the output of the second equality signal detection unit 6 is true, there is the possibility that the $R_0$, $G_0$ and $B_0$ data, although not equality signals, have become equality signals by the processing of the color correction unit 21 and therefore, the first selection unit 9 selects and output $R_2$, $G_2$ and $B_2$ data produced by the nonequality signal producing unit 7. On the other hand, if the output of the second equality signal detection unit 6 is false, the first selection unit 9 selects and outputs the ordinary $R_1$, $G_1$ and $B_1$ data processed by the color correction unit 21.

Further, the output of the first selection unit 9 is inputted to the second selection unit and if the output of the first equality signal detection unit 2 is false, the same output is selected and outputted. On the other hand, if the output of the equality signal detection unit 2 is true, the non-coloring data have been inputted to the color correction unit 21 and therefore, the output from the equality signal producing unit 8 is selected and outputted.

Here, the nonequality signal producing unit 7 inputs the $R_1$, $G_1$ and $B_1$ data and outputs $R_2$, $G_2$ and $B_2$ data. At this time, there are the following relations between the $R_1$, $G_1$, $B_1$ data and the $R_2$, $G_2$, $B_2$ data:

$$R_2 = R_1$$

$$G_2 = G_1$$

$$B_2 = B_1 - 1$$

Also, the equality signal producing unit 8 inputs the $R_1$, $G_1$ and $B_1$ data and outputs $R_3$, $G_3$ and $B_3$ data. At this time, there is the following relation between the $R_1$, $G_1$, $B_1$ data and the $R_3$, $G_3$, $B_3$ data:

$$R_2 = G_2 = B_2 = (R_1 + G_1 + B_1)/3$$

According to the processing of the nonequality signal producing unit 7 and the equality signal producing unit 8, it is possible to maintain the result of the color correction by the color correction unit 2 as far as possible and produce a nonequality signal and an equality signal.

By the above-described construction, $R_0$ $G_0$ $B_0$ object image data depending on the monitor characteristic are color-corrected into $R_4$ $G_4$ $B_4$ raster image data depending on the printer characteristic.

Also, only when $R_0$ $G_0$ $B_0$ object image data are equal (i.e., non-coloring), they are color-corrected so that $R_4$ $G_4$ $B_4$ raster image data may become equal.

Figure 3:
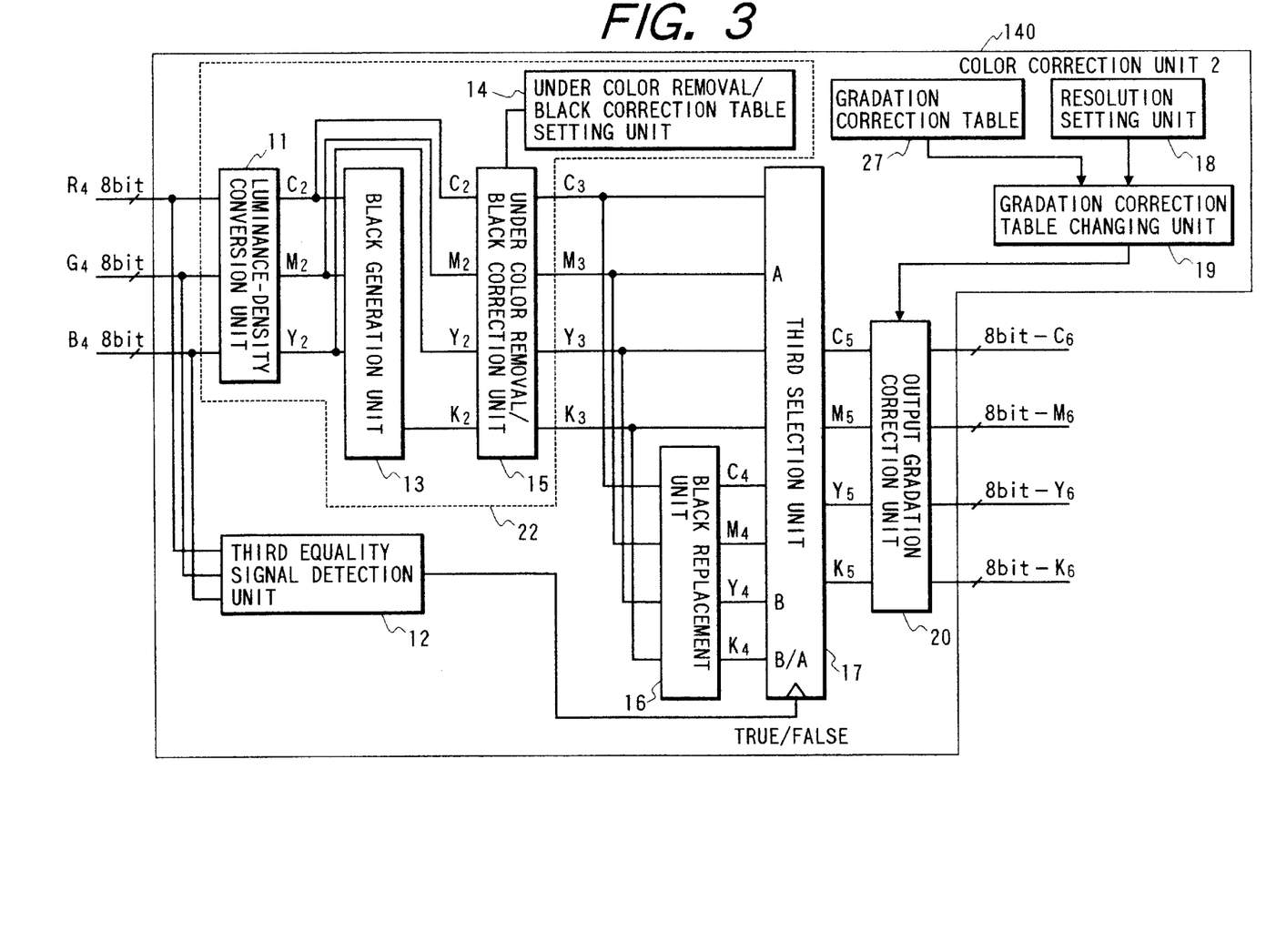
FIG. 3 shows an example of the construction of a color correction unit 2.

FIG. 3 shows an example of the construction of the color correction unit 2 (140).

The color correction unit 2 is comprised of a color conversion unit 22, a third equality signal detection unit 12, a black replacement unit 16, a third selection unit 17 and an output gradation correction unit 20, and further the color conversion unit 22 is comprised of a luminance-density conversion unit 11, a black generation unit 13 and an under color removal/black correction unit 15.

First, the data of the respective pixels of one page prepared by the rendering process are inputted as 8-bit $R_4$, $G_4$ and $B_4$ data to the third equality signal detection unit 12 and the luminance-density conversion unit 11 which is one of the elements constituting the color conversion unit 22.

The third equality signal detection unit 12 detects whether $R_4$, $G_4$ and $B_4$ data are equal, that is, $R_4 = G_4 = B_4$, and if they are equal, the third equality signal detection unit 12 outputs true to the third selection unit 17, and if not so, it outputs false to the third selection unit 17.

On the other hand, the luminance-density conversion unit 11 again converts the signal converted into a luminance signal by the density-luminance conversion unit 5 into a density signal.

$C_2$, $M_2$ and $Y_2$ data outputted from the luminance-density conversion unit 11 are inputted to the black generation unit 13, and produce $K_2$ data indicative of a non-coloring component on the basis of the following expression:

$$K_2 = \min (C, M, Y),$$

where min (C, M, Y) represents a function selecting the minimum values of C, M and Y.

By thus producing $K_2$ at the minimum values of C, M and Y, color balance can be kept good.

$K_2$ data indicative of a non-coloring component generated by the black generation unit 13 and $C_2 M_2 Y_2$ data produced by the luminance-density conversion unit 11 are inputted to the under color removal/black correction unit 15.

In the under color removal/black correction unit 15, reference is had to a look-up table set by an under color removal/black correction table setting unit 14 to thereby perform under color removal processing and black correction processing (black generation) and produce $C_3$, $M_3$, $Y_3$ and $K_3$ data. The relations between $C_2$, $M_2$, $Y_2$, $K_2$ data and $M_3$, $Y_3$, $K_3$ data are as follows:

$$C_3 = C_2 - \text{Table}_{UCRC}(K_2)$$
$$M_3 = M_2 - \text{Table}_{UCRM}(K_2)$$
$$Y_3 = Y_2 - \text{Table}_{UCRY}(K_2)$$
$$K_3 = \text{Table}_{BGR}(K_2)$$

Here, $\text{Table}_{UCRC}$, $\text{Table}_{UCRM}$ and $\text{Table}_{UCRY}$ represent referring to an under color removal table set by the under color removal/black correction table setting unit 14, and $\text{Table}_{BGR}$ represents referring to a black correction table set by the same setting unit.

Figure 6:
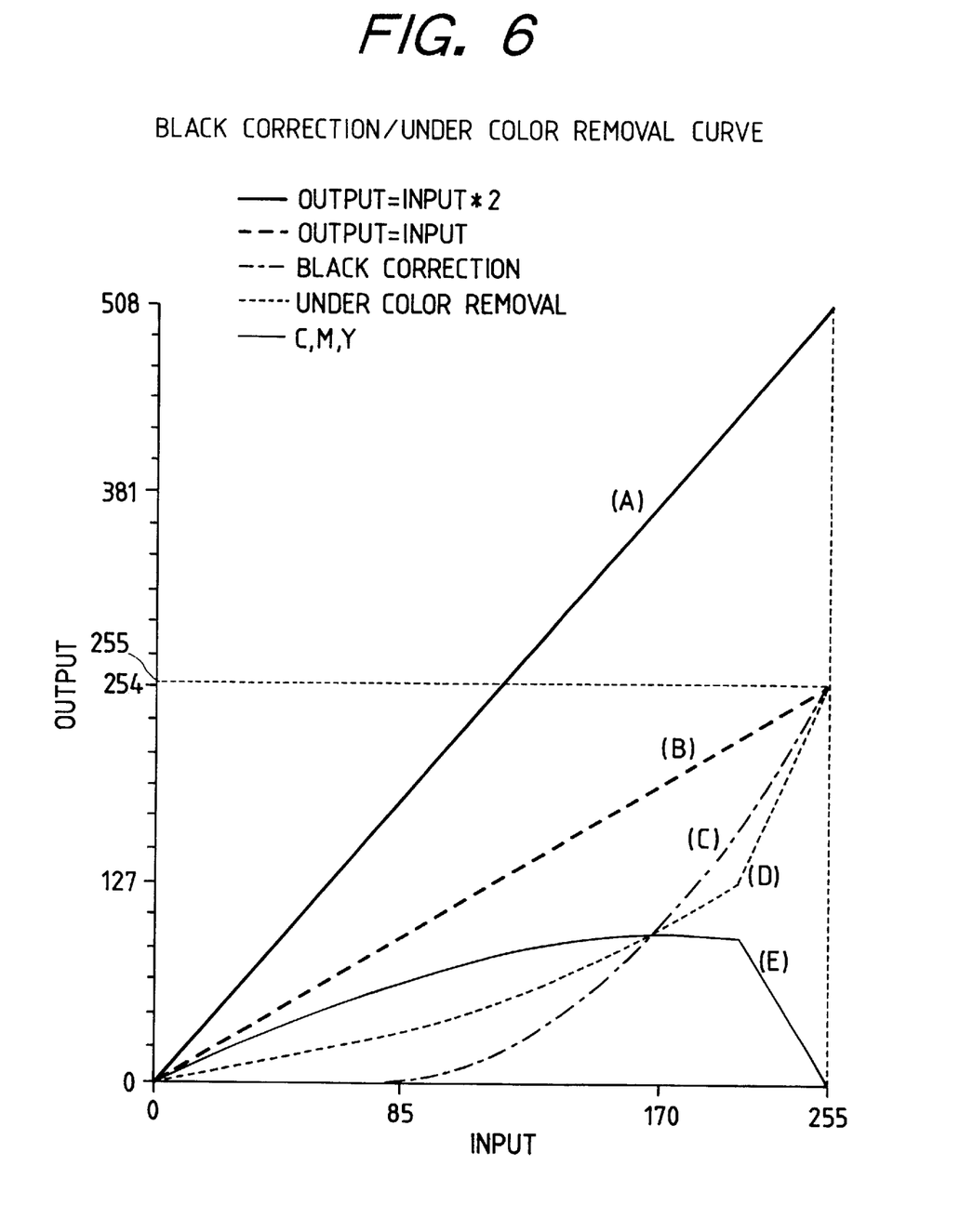
FIG. 6 shows an example of a black correction/under color removal curve.

Curves set in the black correction and under color removal tables are shown in FIG. 6. First, a black correction curve is 0 up to ⅓ of the maximum value (255) of the input, and may smoothly rise by a quadratic curve if it exceeds ⅓. Thus, K does not enter in a low density portion and therefore, the reproducibility of the color of the low density portion such as the color of the skin becomes good.

Further, the black correction curve is adapted to assume the maximum value (255) of the output at the maximum value of the input, and on the other hand, an under color removal curve is also adapted to assume the maximum value of the output at the maximum value of the input and therefore, when $C_2 = M_2 = Y_2 = 255$, $K_2 = 255$ and thus, recording is effected in one color K. Thus, it never happens that any other color mixes with the portion of K 100% which it is originally desired to record in one color K.

Also, in FIG. 6, a curve E is a curve resulting from plotting a curve obtained by subtracting the under color removal value from the input value, and design is made such that ever three times this curve (corresponding to three colors C, M and Y) plus the black correction curve does not exceed a straight line of output=input*2.

Further, in order to make the reproducibility of colors in the low density portion good, K is not put in and therefore in the low density portion, a maximum amount of drive-in is exceeded. So, in the present embodiment, under color is removed from the low density portion, whereby the amount of drive-in is regulated so as to become equal to or less than the maximum amount of drive-in. Moreover, in the low density portion, under color removal is effected by the use of a function in which no discontinuous point exists and therefore, the continuity of colors can be maintained.

Thus, according to the under color removal and black correction in the present embodiment, at each input value indicative of non-coloring, the total value of C, M, Y and K outputs is regulated so as to become equal to or less than two times the input value and therefore, it is possible to reproduce the gradation in non-coloring within an entire range in which such gradation can be reproduced. Further, for the input value of any of non-coloring and coloring, the total value can be regulated to the maximum value (in this case, 200%) or less of the amount of drive-in of ink set on the basis of the characteristic of a recording medium.

Color-converted $C_3$, $M_3$, $Y_3$ and $K_3$ data are inputted to the black replacement unit 16 and the third selection unit 17.

The black replacement unit 16 receives the $C_3$, $M_3$, $Y_3$ and $K_3$ data as inputs, and outputs $C_4$, $M_4$, $Y_4$ and $K_4$ data replaced with only one color, black. At this time, there are the following relations between the $C_3$, $M_3$, $Y_3$, $K_3$ data and the $C_4$, $M_4$, $Y_4$, $K_4$ data:

$$C_4 = M_4 = Y_4 = 0$$
$$K_4 = K_3 + \alpha \times C_3 + \beta \times M_4 + \gamma \times Y_4 \ldots (\alpha, \beta \text{ and } \gamma \text{ being constants})$$

The third selection unit 17 selects and outputs one of the outputs from the under color removal/black correction unit 15 and the black replacement unit 16 by the result of the detection by the equality signal detection unit 12. That is, when the output of the third equality signal detection unit 12 is true, non-coloring has been inputted and therefore, the third selection unit 17 selects the input from the black replacement unit 16, and when the output of the third equality signal detection unit 12 is false, the third selection unit 17 selects the input from the ordinary under color removal/black correction unit 15 and outputs it as $C_5 M_5 Y_5 K_5$ data.

Consequently, only when $R_4 G_4 B_4$ data are equal ($R_4 = G_4 = B_4$), color correction can be effected so that $C_5 M_5 Y_5 K_5$ data may become equal ($C_5 = M_5 = Y_5 = 0$, $K_5 = K_4$).

The $C_5$, $M_5$, $Y_5$ and $K_5$ data outputted from the third selection unit 17 are inputted to the output gradation correction unit 20, whereby gradation correction processing is performed and those data are outputted as $C_6$, $M_6$, $Y_6$ and $K_6$ data.

The reference numeral 18 designates a resolution setting unit which sets the value of the resolution to be recorded in a recording apparatus is conformity therewith.

The reference numeral 27 denotes a gradation correction table in which a gradation correction characteristic used when low resolution recording is effected by the recording apparatus is stored, and this table is read out by an output gradation correction characteristic changing unit 19 and is changed thereby, and is delivered to an output gradation correction unit 20.

The output gradation correction characteristic changing unit 19 reads out the gradation correction table 27, changes it in conformity with the resolution set by the resolution setting unit 18 and delivers it to the output gradation correction unit 20.

Figure 10:
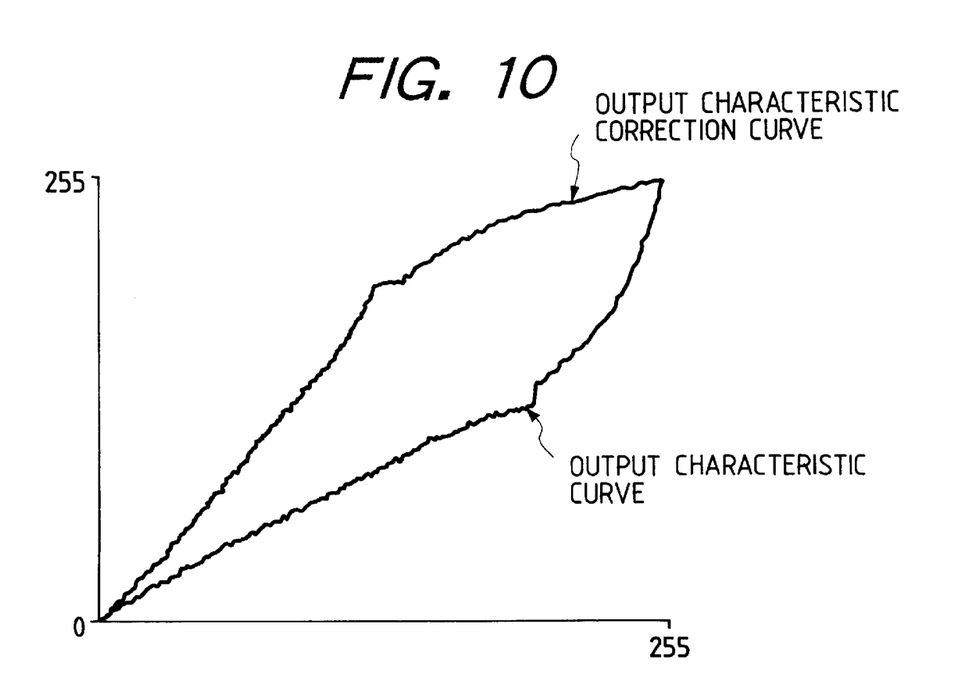
FIG. 10 shows an example of output gradation correction processing.
Figure 11:
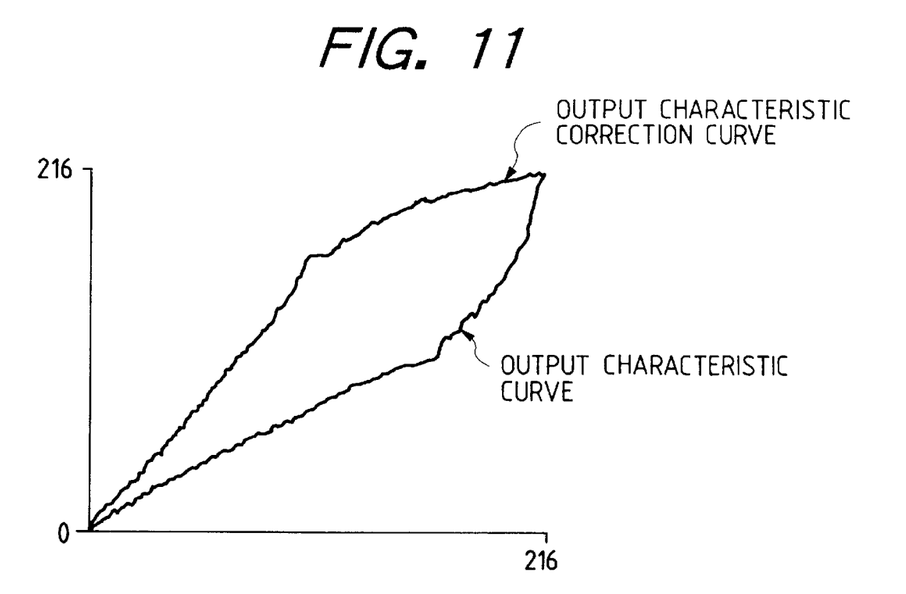
FIG. 11 shows an example of output gradation correction processing.

FIGS. 10 and 11 are graphs schematically showing how the output gradation correction characteristic changing unit changes the gradation correction characteristic of the recording apparatus, FIG. 10 showing an output characteristic curve and an output characteristic correction curve when low resolution is set by the resolution setting unit 18, and FIG. 11 showing an output characteristic curve and an output characteristic correction curve when high resolution is set by the resolution setting unit 18.

A recording method when an image is formed at low resolution and an image is formed at high resolution, by the printer 300, will first be described with reference to FIGS. 12 and 13.

The printer 300 in the present embodiment uses a serial recording system which effects recording while moving a recording head having a plurality of nozzles arranged in the sub scanning direction, in the main scanning direction, and moves a recording medium in the sub scanning direction when the recording of one line is terminated, and returns the recording head to a recording start position and effects the recording of the next line, and effects the recording of one page by a similar procedure thereafter.

In such a recording apparatus, in order to form an image at high resolution, the movement of the recording head in the main scanning direction is effected at a half of the ordinary pitch without the dot diameter of the recording head being changed, whereby apparently the resolution in the main scanning direction can be doubled.

Figure 12:
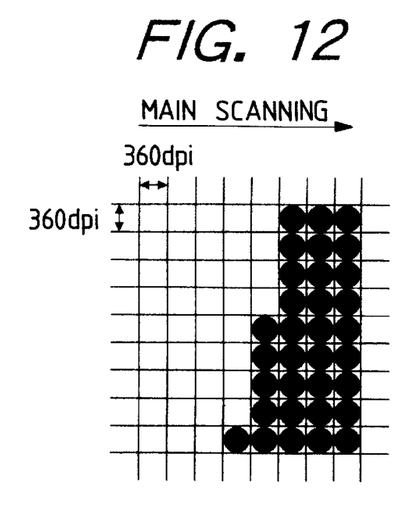
FIG. 12 shows an example of high resolution recording.
Figure 13:
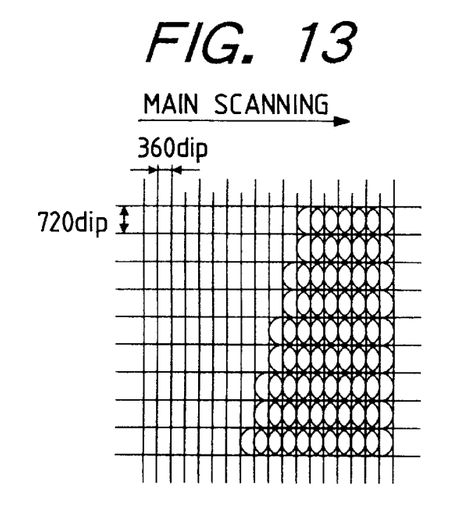
FIG. 13 shows an example of low resolution recording.

In a recording apparatus wherein the resolution of length× width is 360 dpi (dots per inch)×360 dpi, recording is performed as shown in FIG. 12. On the other hand, when the movement of the recording head in the main scanning direction (in this case, the lateral direction) is effected at a half of the ordinary pitch, recording should be performed as shown in FIG. 13. However, the size of ink droplets jetted from the recording head is designed to become suitable at the original resolution and therefore, if recording is effected as it is, a double amount of ink will be caused to adhere to the recording medium and depending on the medium, the ink will overflow.

Consequently, when an image is to be formed at high resolution, the signals of $C_5$ $M_5$ $Y_5$ $K_5$ having a level of 0–255 are compressed to a level of 0–216 to regulate the amount of ink.

Figure 8:
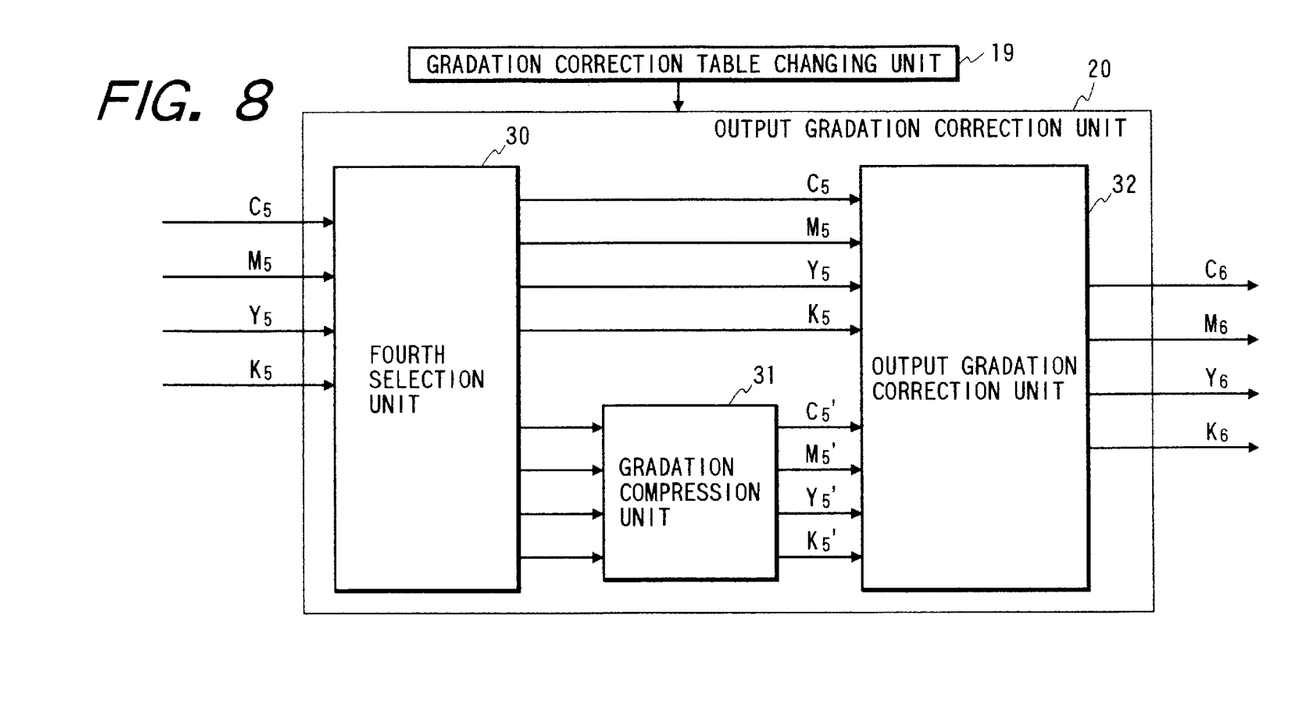
FIG. 8 shows an example of the construction of an output gradation correction unit 20.

The construction of the output gradation correction unit 20 will hereinafter be described with reference to FIG. 8.

A fourth selection unit 30 and an output gradation correction unit 32 are controlled in operative association with each other by a control signal from the gradation correction table.

Figure 9:
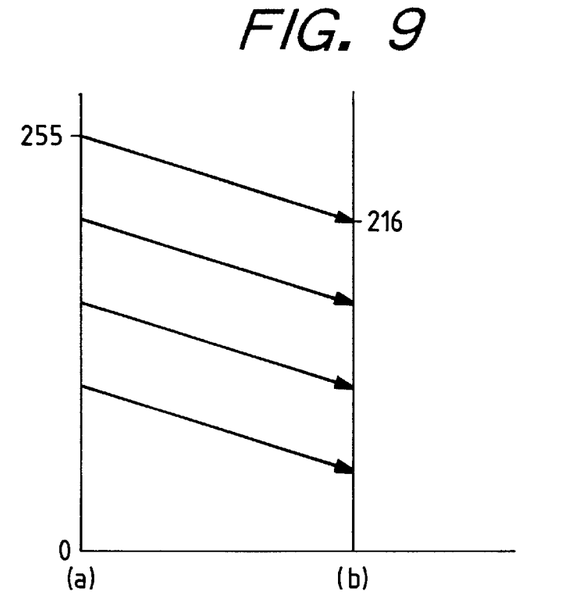
FIG. 9 shows an example of the processing of a gradation compression unit 31.

When high resolution recording is set by the resolution setting unit 18, the fourth selection unit 30 outputs $C_5$ $M_5$ $Y_5$ $K_5$ data to a gradation compression unit 31 by a control signal from the gradation correction table changing unit 19. The gradation compression unit 31 compresses component signals of $C_5$ $M_5$ $Y_5$ $K_5$ ((a) in FIG. 9) having a level of 0–255 as shown in FIG. 9 to within a level of 0–216 in conformity with the input level ((b) in FIG. 9) to regulate the amount of ink correspondingly to the high resolution recording, and outputs them to the output gradation correction unit 32.

By the signals being thus compressed in conformity with the input level, gradation can be maintained as far as possible.

On the other hand, when low resolution recording is set by the resolution setting unit 18, the fourth selection unit 30 outputs $C_5$ $M_5$ $Y_5$ $K_5$ data to the output gradation correction unit 32.

The output gradation correction unit 32 refers to the above-described gradation correction table changed by the gradation correction table changing unit 19 on the basis of the gradation recording set by the resolution setting unit 18 and performs the output gradation correction processing shown below.

$C_6$=Table $\gamma_C$ ($C_5$ or $C_5'$)

$M_6$=Table $\gamma_M$ ($M_5$ or $M_5'$)

$Y_6$=Table $\gamma_Y$ ($Y_5$ or $Y_5'$)

$K_6$=Table $\gamma_K$ ($K_5$ or $K_5'$)

Table $\gamma_C$, Table $\gamma_M$, Table $\gamma_Y$ and Table $\gamma_K$ represent referring to the gradation correction tables corresponding to the respective colors.

When low resolution recording is designated, the output gradation correction unit 32, as can be seen from FIG. 10, has its output correction curve set so that the output value thereof (in the present embodiment, the density value mapped from 0 to 255) may become linear relative to the whole range (0 to 255) of the input value. That is, the output correction curve is set on the basis of the strain the output characteristic that the printer 300 has.

On the other hand, as can be seen from FIG. 11, when high resolution recording is designated, the output correction curve is set so that the output value thereof may become linear relative to a part (0 to 216) of the whole range of the input value. This reflects the phenomenon that even when the resolution is changed, if the recording media are the same, the output characteristic thereof does not change and correspondingly to the amount by which the input range thereof has simply become narrow, that is, the resolution has become high relative to an input of 217 or greater, the amount of drive-in increases and the density reaches its uppermost limit. Accordingly, the shape of the output characteristic curve in FIG. 11 becomes a shape in which the output characteristic curve in FIG. 10 has been reduced at the same rate for both of the input and the output because the maximum amount of ink per unit area does not change.

In the case of high resolution recording, the range for each pixel is regulated to 216, but image recording density becomes high and therefore, the maximum amount of ink per unit area on the recording medium does not change in the case of low resolution recording.

In high resolution recording, the maximum density can be maintained. Rather in high resolution recording, the recording density becomes higher and therefore the contrast of the whole is emphasized.

On the other hand, low resolution recording uses a level of 0–255 as shown in FIG. 10 and therefore can reproduce the medium tone area well.

As described above, it is possible to perform gradation correction processing based on the set resolution recording.

The output gradation correction characteristic changing unit 19 does not apply a change to the gradation correction table holding an output correction curve corresponding to low resolution recording when low resolution recording is designated by the resolution setting unit 18, and sets in the output gradation correction unit 20 a gradation correction table having a characteristic in which said output correction curve has been reduced at the same rate with the input and output when high resolution recording is designated.

Consequently, even in a system wherein the characteristic of the output gradation correction changes in conformity with the set resolution, there becomes possible the construction of a system in which a plurality of data for the output gradation correction to be held need not be waited for.

As described above, according to the present embodiment, before in the color correction unit 2, under color removal/black correction processing is performed with the minimum value of CMY as K and CMYK signal is obtained, K is found from the product of CMY in the color correction unit 1 and correction is effected in advance by this value and therefore, the gray balance of the CMYK signal outputted from the color correction unit 2 becomes good.

Also, black generation is effected and color correction is effected in each of the color correction unit 1 and the color correction unit 2 and therefore, black generation of high quality can be effected efficiently.

Also, according to the construction of the present embodiment, even in a construction wherein the color processing in the color correction unit 1 and the color processing in the color correction unit 2 are separately performed, recording can be effected in one color, black, by the printer only when the input signal is non-coloring.

Also, according to the under color removal/black correction unit 15, K is not put into a low density portion and the tone of color is reproduced well and at the same time, in a high density portion, reproduction is effected including K and therefore, recording of high density becomes possible.

Further, when C, M and Y have all reached their maximum density, recording can be done in one color, K.

Moreover, for any input signal, recording can be done without exceeding the maximum amount of drive-in of ink in the recording apparatus.

Also, as in the present embodiment, the color correction unit 1 is provided before the rendering driver for analyzing and developing the object image data, and the strain based on the monitor characteristic is corrected by the luminance-density conversion unit 1, and the color signal based on the printer characteristic is corrected by the masking unit 4 and therefore, high-speed processing can be performed as compared with a case where color correction is effected in each pixel for the image signal after being developed.

Figure 14:
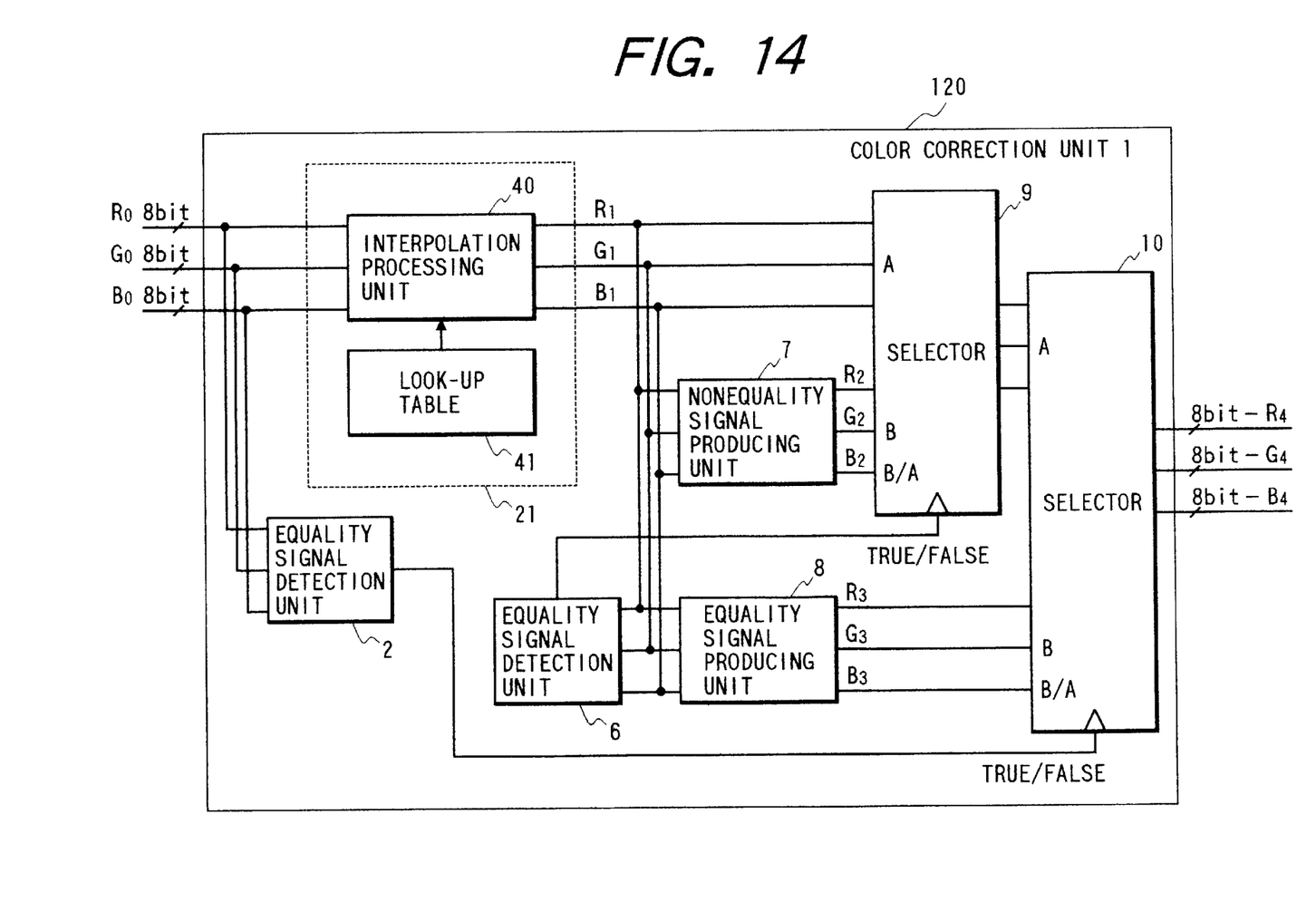
FIG. 14 shows an example of the construction of the color correction unit 1 in a modification.

FIG. 14 is a block diagram illustrating a modification of the above-described embodiment.

In this modification, the same portions as those in the above-described embodiment are given the same reference numerals and need not be described.

In the present modification, a color correction unit comprised of an interpolation processing unit 25 and a look-up table 26 is adopted instead of the color correction unit 21 comprised of the luminance-density conversion unit 1, the black generation unit 3, the masking unit 4 and the density-luminance conversion unit 5. In the case of the modification, color correction processing is performed by an interpolation calculation referring to the look-up table 26 having on a grating point a value subjected in advance to luminance-density conversion processing, black generation processing, masking processing and density-luminance conversion processing. By adopting such a construction, it becomes possible to reduce a plurality of color correction processings to an interpolation processing.

In the embodiments described herein, each signal is a digital signal of 8 bits, but alternatively may be data comprised of 12 bits, 16 bits, . . . , N bits or the like.

Also, the recording apparatus, if it uses black as non-coloring, is not restricted to a color ink jet recording apparatus, but may be a heat transfer recording apparatus, an electrophotographic recording apparatus or the like.

Also, in the above-described embodiments, the threshold value at which the output of the black correction unit is 0 is up to ⅓ of the maximum input value, but it need not be limited to this value. Also, while the total value of the C, M, Y and K outputs at the respective input values is two times the input value or less, this neither need not be limited to this value.

Also, in the above-described embodiments, the maximum value of the amount of drive-in of ink is 200%, but this is a value set on the basis of the kind of the recording medium and therefore, use can be made of a value corresponding to the kind of the recording medium.

When images can be formed on a plurality of recording media, a table to be set in the under color removal/black correction unit can be set in conformity with each recording medium.

The printer 200 is not restricted to the above-described one, but images may be formed by the use, for example, of a head discharging liquid droplets from a predetermined discharge port.

The present invention may be applied to both of a system comprised of a plurality of instruments (such as a host computer, an interface instrument, a reader and a printer) and an apparatus comprising an instrument (for example, a copying apparatus or a facsimile apparatus).

An apparatus in which a program code of software for realizing the function of the above-described embodiments is supplied to a computer in an apparatus or a system connected to various devices so as to operate the various devices so as to realize the function of the above-described embodiments and the computer (CPU or MPU) of the system or apparatus is embodied by operating said various devices in accordance with a program stored therein is also covered by the category of the present invention.

Also, in this case, the program code of said software itself realizes the function of the aforedescribed embodiments, and the program code itself and means for supplying the program code to the computer, for example, a memory medium storing such program code therein, constitute the present invention.

As the memory medium storing such program code therein, use can be made, for example, of a floppy disc, a hard disc, an optical disc, a magneto-optical disc, a CD-ROM, a magnetic tape, a nonvolatile memory card, a ROM or the like.

Of course, such program code is also covered by the embodiments of the present invention when by the computer executing the program code supplied thereto, not only the function of the aforedescribed embodiments is realized, but the function of the aforedescribed embodiments is realized jointly with an OS (operating system) in which the program code is at work in the computer, or other application software.

Further, the present invention of course also covers a case where after the supplied program code is stored in a memory provided in the function expanding board of the computer or a function expanding unit connected to the computer, a CPU or the like provided in the function expanding board or the function expanding unit executes part or the whole of actual processing and the function of the aforedescribed embodiments is realized by that processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus which controls under color removal processing and black generation processing based on a quantity of recording material formable on a recording medium, comprising:

color correction means for performing the under color removal processing and the black generation processing corresponding to a characteristic of a recording medium, and outputting data including a plurality of color component data including black component data, wherein the under color removal processing and the black generation processing are performed by said color correction means such that a total value of said plurality of color component data are controlled on a basis of a limiting value corresponding to an input level, and wherein said limiting value is obtained by using a function set based on the quantity of recording material formable on the recording medium and changes according to the input level.

2. An image processing apparatus according to claim 1, wherein said limiting value has a linear relation to said input level, and said input level is corresponding to a value of one color component of input image data indicating an achromatic color.

3. An image processing apparatus according to claim 1, characterized in that when said input level is maximum, said color correction means renders the level of the data indicative of the color components outputted by said color removal processing substantially zero.

4. An image processing apparatus according to claim 1, characterized in that said color correction means renders the level of the data indicative of said black component substantially zero until said input level assumes a predetermined value.

5. An image processing apparatus according to claim 1, further comprising:

forming means for forming an image by the use of a head discharging liquid droplets from a predetermined discharge port.

6. An image processing method which controls under color removal processing and black generation processing based on a quantity of recording material formable on a recording medium, comprising:

a color correction step, of performing the under color removal processing and the black generation processing corresponding to a characteristic of a recording medium, and outputting data including a plurality of color component data including black component data, wherein the under color removal processing and the back generation processing include controlling a total value of said plurality of color component data on a basis of a limiting value corresponding to an input level, and wherein said limiting value is obtained by using a function set based on the quantity of recording material formable on the recording medium and changes according to the input level.

7. A computer readable storage medium having recorded thereon codes for implementing a computer implementable method for image processing which controls under color removal processing and black generation processing based on a quantity of recording material formable on a recording medium, comprising:

a color correction step, of performing the under color removal processing and the black generation processing corresponding to a characteristic of a recording medium, and outputting data including a plurality of color component data including black component data, wherein the under color removal processing and the black generation processing include controlling a total value of said plurality of color component data on a basis of a limiting value corresponding to an input level, and wherein said limiting value is obtained by using a function set based on the quantity of recording material formable on the recording medium and changes according to the input level.

* * * * *

UNITED STATES PATENT AND TRADEMARK OFFICE
CERTIFICATE OF CORRECTION

PATENT NO. : 6,574,010 B1  Page 1 of 1
DATED : June 3, 2003
INVENTOR(S) : Nobuo Ohnuma et al.

It is certified that error appears in the above-identified patent and that said Letters Patent is hereby corrected as shown below:

<u>Title page,</u>
Insert: -- [74] *Attorney, Agent, or Firm*—Fitzpatrick, Cella, Harper & Scinto --.

<u>Drawings,</u>
Sheet 1 of 10, FIG. 1, "BINALIZING" should read -- BINARIZING --.
Sheet 5 of 10, FIG. 5, "BINALIZING" should read -- BINARIZING --.

<u>Column 1,</u>
Line 7, "invention-relates" should read -- invention relates --; and
Line 19, "R." should read -- R, --.

<u>Column 2,</u>
Line 34, "processing-and" should read -- processing and --.

<u>Column 7,</u>
Line 8, "reference is had" should read -- reference is made --; and
Line 44, "ever" should read -- even --.

<u>Column 11,</u>
Line 48, "neither" should read -- either --.

Signed and Sealed this

Twenty-seventh Day of January, 2004

JON W. DUDAS
*Acting Director of the United States Patent and Trademark Office*